Patented May 19, 1953

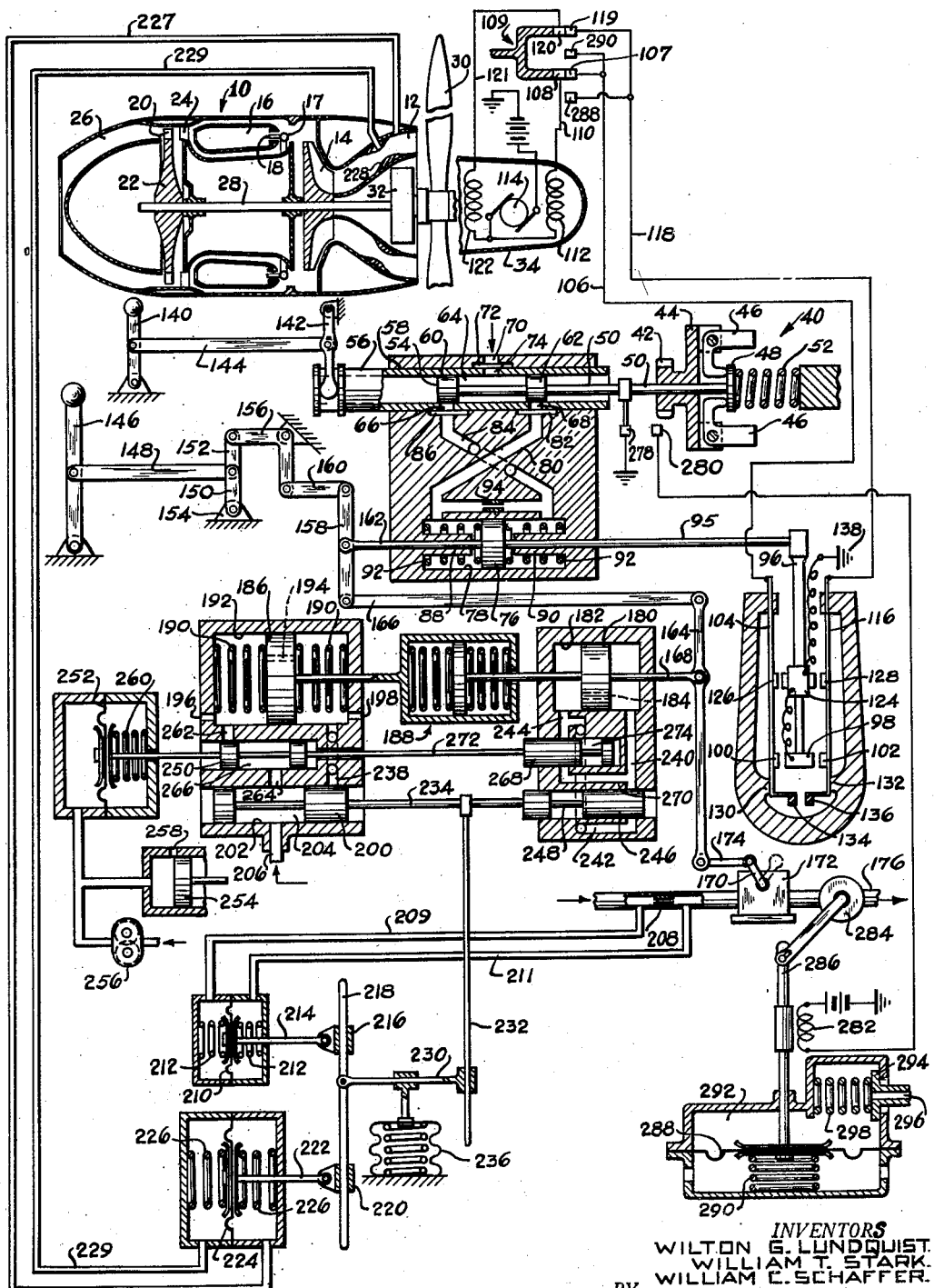

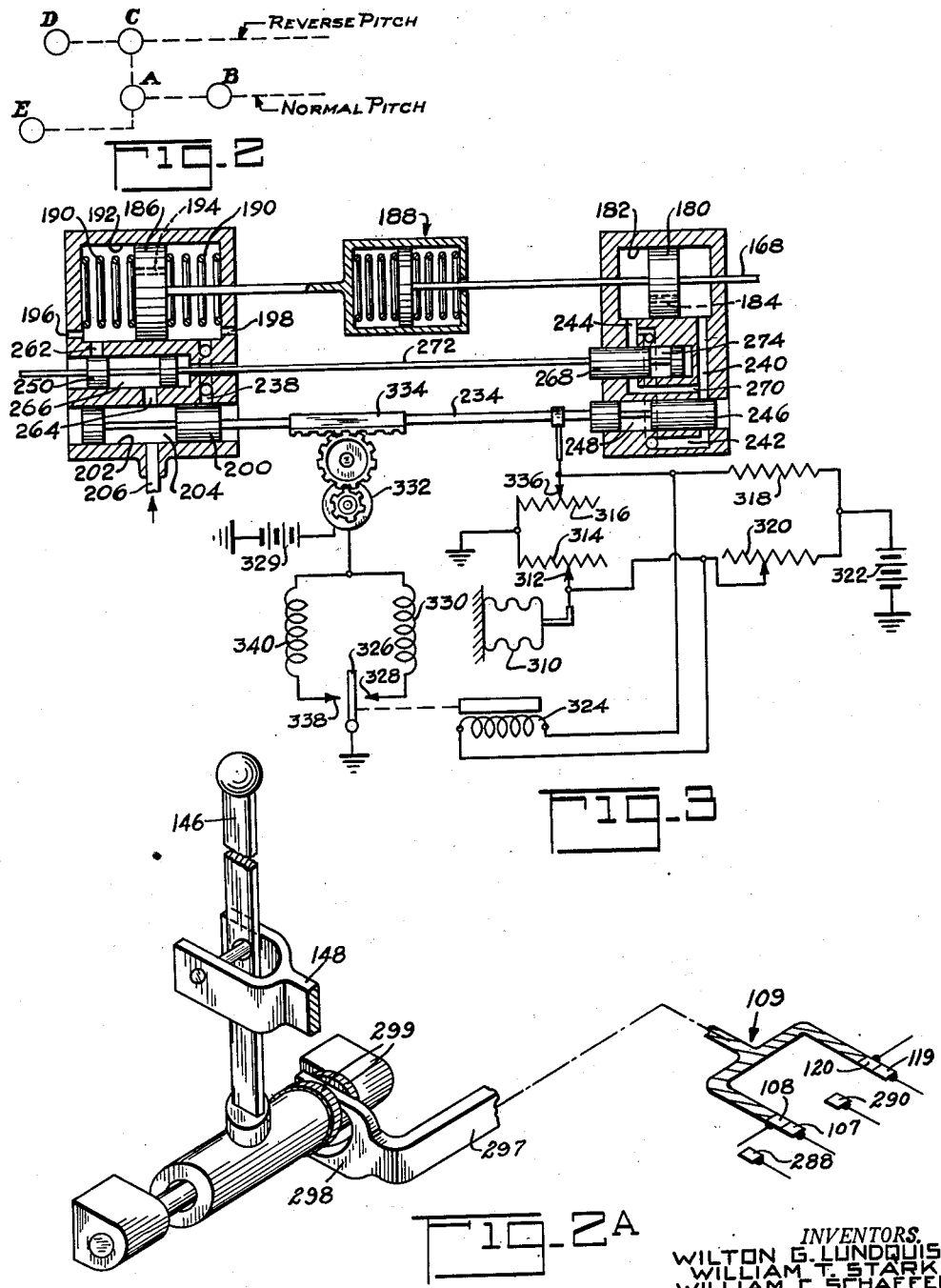

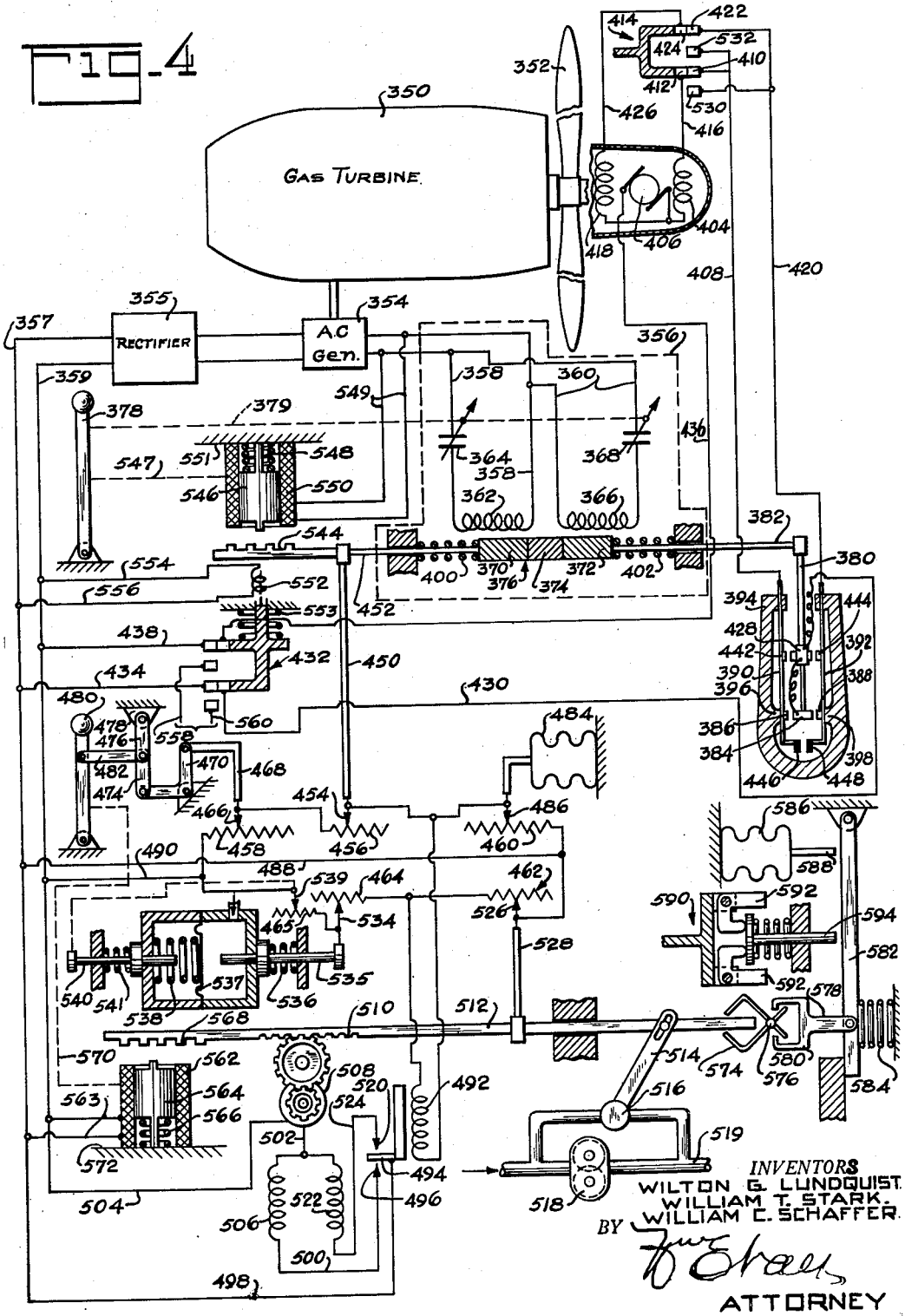

2,638,992

UNITED STATES PATENT OFFICE 2,638,992

GAS TURBINE POWER CONTROL

Wilton G. Lundquist, Hohokus, William T. Stark, Pompton Lakes, and William C. Schaffer, Fairlawn, N. J., assignors to Curtiss-Wright Corporation, a corporation of Delaware Application July 12, 1946, Serial No. 683,264

26 Claims. (Cl. 170—135.74)

This invention relates to control systems for gas turbines and is particularly directed to a control system for a gas turbine drivably connected to an adjustable pitch aircraft propeller.

The conventional reciprocating type aircraft engine and propeller combination generally is provided with two regulators for controlling the engine power output—namely, a governor and a manifold pressure regulator. The governor only controls the engine speed by regulating pitch angle of the propeller blades to maintain the engine speed for which the governor is set, while the manifold pressure regulator only maintains this pressure and, therefore, engine torque at a pre-set value—for example, by controlling the position of the engine throttle valve which in turn effects control of the engine fuel supply. In a gas turbine propeller combination, control of the power is more difficult, particularly because of the relation between the power characteristics of gas turbines and aircraft propellers. Thus, the conventional type of gas turbine, when operating at a constant combustion chamber temperature, will have a curve of brake horsepower versus turbine speed differing only slightly in its curvature and slope from that of the power absorbed versus propeller speed curve of a conventional propeller operating at a particular pitch angle of its blades. Accordingly, if the conventional reciprocating engine power control is applied to a gas turbine, large and rapid changes in the pitch angle of the propeller blades are necessary to maintain a stable engine speed. In fact, with only these two conventional speed and torque regulators, stability of the turbine speed may be impossible if the brake horsepower of the turbine increases faster with increase in turbine speed than the power absorbed by the propeller.

An object of this invention is to provide a novel and stable gas turbine power control system. Particularly, it is an object of this invention to provide a gas turbine power control system in which departure of the turbine speed from a predetermined value not only results in adjustment of the pitch of the propeller blades but also effects adjustment of the rate at which fuel is supplied to the engine. The arrangement is such that major corrections of the turbine speed are obtained by adjustment of the propeller blades and small or final corrections are obtained by adjustment of the fuel flow. A further object of this invention comprises control of the turbine fuel supply in response to turbine combustion chamber temperature or to some equivalent function.

In one embodiment of the invention, the turbine temperature control provides an upper limit for the temperature of the turbine combustion chamber and in another embodiment of the invention, the temperature control automatically operates to maintain a predetermined turbine combustion chamber temperature.

In a reciprocating type of internal combustion engine, the fuel flow can readily be adjusted to a minimum value suitable for engine idling operation. However, in a gas turbine type of internal combustion engine, the minimum fuel flow which will keep the turbine operating varies considerably with such factors as aircraft speed, surrounding air temperature, air density, etc. Accordingly, a further object of this invention is to provide a turbine power control capable of providing the minimum fuel flow necessary for satisfactory turbine idling operation. To this end, means are provided to insure a fuel flow sufficient to maintain a predetermined minimum turbine torque. Also, since the torque output of an aircraft gas turbine varies with such factors as aircraft speed, air density, etc. it is a further object of this invention to provide means to prevent the turbine torque output from exceeding a predetermined value.

It is common practice not only to adjust the pitch of propeller blades for regulating the speed of an aircraft engine but also to reverse the pitch of the blades to provide the aircraft with reverse thrust—for example, in order to brake the forward speed of the aircraft during landing of the aircraft. A still further object of this invention is to provide a power control system for a gas turbine which is operative, not only during normal forward thrust operation of the gas turbine propeller combination, but also during reverse thrust operation.

Another object of this invention comprises the provision of an engine power control system in which the engine drives an alternating current generator and the frequency of the generator current controls the engine speed by controlling the pitch of the propeller blades. In addition, in this latter modification of the invention, the generator provides the power for regulating the engine fuel flow and for adjusting the propeller blades.

Other objects of this invention will become apparent upon reading the annexed detailed description in connection with the drawing in which:

Figure 1 is a diagrammatic view of one embodiment of the invention;

Figure 2 is a diagrammatic view illustrating the path of shift movement of the torque control lever;

Figure 2A is a perspective view illustrating a form of mechanical connection between the control lever and the reversing switch;

Figure 3 is a view of a modification of a portion of Figure 1; and

Figure 4 is a diagrammatic view of a further modification.

Referring first to Figure 1 in the drawing, there is schematically illustrated a gas turbine power plant 10 for aircraft. The power plant comprises a forwardly opening air intake duct 12 for an air compressor unit 14. The air delivered by the compressor unit 14 enters the combustion chamber 16 to which fuel is supplied from a fuel manifold 17 through nozzles 18. From the combustion chamber 16, the combustion gases are directed into the turbine blades 20 of the turbine rotor 22 by a turbine nozzle 24. Upon leaving the turbine blades 20, the exhaust gases are discharged rearwardly through the exhaust duct 26. The turbine rotor 22 is drivably connected to the compressor unit 14 by a shaft 28. In addition, the shaft 28 is connected to the propeller 30, preferably through a suitable reduction gear unit 32. The nose 34 of the propeller hub is provided with conventional mechanism for adjusting the pitch of the propeller blades. The structure so far described is conventional.

The power control system of the turbine 10 comprises a governor 40 having an annular gear 42 drivably connected to the turbine by means not shown. The gear 42 is formed with an annular plate 44 upon which a pair of flyweights 46 are pivotally mounted. The inner ends of the flyweights engage a flange 48 formed on one end of a rod 50 extending through the plate 44 and the gear 42. A governor spring 52 acts against the rod 50 to restrain radially outward pivotal movement of the flyweights 46 in response to the centrifugal forces acting thereon. The other end of the rod 50 is connected to a valve 54 slidable within a sleeve 56 which in turn is slidable within a bore 58. The valve 54 is provided with a pair of spaced lands or enlargements 60 and 62 providing an annular space 64 therebetween. The lands or enlargements 60 and 62 are arranged to control similarly spaced radial passages 66 and 68 in the sleeve 56. A suitable fluid under pressure is supplied through a passage 70 and a longitudinal groove 72 to a radial passage 74 through the sleeve 56 communicating with the annular space between the lands 60 and 62. The open ends of the sleeve 56 communicate with a suitable drain or sump (not shown).

The valve 54 and sleeve 56 comprise a servo unit for controlling a piston 76 slidable within a closed cylinder 78. The left end of the cylinder 78 (Figure 1) communicates with the radial passage 68 in the sleeve 56 via a passage 80 and a longitudinal groove 82 while the other end of the cylinder 78 communicates with the radial sleeve passage 66 via a passage 84 and a longitudinal groove 86.

In the position illustrated in Figure 1, the valve 54 and sleeve 56 are in their relative neutral position—that is, the valve 54 closes both passages 66 and 68. If the turbine slows down, the governor 40 moves the valve 54 to the left to admit fluid pressure from the annular space 64 through the passage 84 to the right end of the cylinder 78. At the same time, the left end of the cylinder 78 is vented through the passage 80 to the right end of the sleeve 56. Accordingly, a decrease in the speed of the turbine effects movement of the piston 76 to the left and vice versa whereby said piston 76 is responsive, in its movements, to changes in the speed of the turbine. Stops 88 and 90 are provided so that the piston 76 only has a small limited movement from its mid position toward which the piston is urged by a pair of springs 92. A restricted passage 94 connects the two ends of the cylinder 78 so that the springs 92 can return the piston 76 to its mid position when valve 54 and sleeve 56 return to their neutral position. In place of the restricted passage 94, the piston 76 may be provided with a loose fit within the cylinder 78.

The piston 76 is movable between the stops 88 and 90 to control the pitch angle of the blades of the propeller 30. To this end, the piston 76 is connected by a rod 95 to a contact arm 96 having a contact 98 movable between a pair of spaced contacts 100 and 102. The contact 100 is mounted on a flexible arm 104 which in turn is connected by a wire 106 to contacts 107 and 108 of a reversing switch 109 and then by a wire 110 to a first winding 112 of a motor 114 operative to change the pitch angle of the blades of the propeller 30. The contact 102 is mounted on a flexible arm 116 which is connected by a wire 118, contacts 119 and 120 of the reversing switch 109 and a wire 121 to a second winding 122 of the motor 114. The purpose of the reversing switch 109 is hereinafter described. With the arrangement so far described, when the piston 76 moves to the left against the stop 88, the contacts 98 and 100 engage to complete a circuit through the winding 112 whereupon the motor 114 operates to decrease the pitch angle of the propeller blades, thereby effecting an increase in the speed of the turbine. Similarly, upon movement of the piston 76 to the right against the stop 90, the contacts 98 and 102 engage to complete a circuit to the winding 122, whereupon the motor 114 operates in the reverse direction to increase the pitch angle of the propeller blades, thereby decreasing the speed of the turbine.

Means are provided to insure that once the contact 98 engages either of its associated contacts 100 or 102, the engaged contacts remain closed until the piston 76 returns to its approximate mid position. To this end, the switch arm is provided with a winding 124 connected in series with the contact 98. The winding 124, when energized, comprises a magnet adapted to attract metallic shoes 126 or 128 formed on the flexible contact arms 104 and 116 respectively. Shoulders 130 and 132 are disposed behind the flexible contact arms 104 and 116 respectively and against which the contact arms are urged by their inherent resiliency. The contact arms 104 and 116 are also provided with facing insulated projections 134 and 136 respectively.

With the arms 104 and 116 disposed against their respective shoulders 130 and 132, the projections 134 and 136 have a spacing approximately equal to one-half the range of movement of the piston 76 between its stops 88 and 90. With this arrangement, when, for example, the piston 76 moves to the left against the stop 88, contacts 98 and 100 engage to complete a circuit to the pitch decreasing winding 112. This circuit is completed through the magnet 124 to the ground schematically indicated at 138 whereupon the magnet attracts and holds the shoe 126 on the flexible contact arm 104. When the piston 76 subsequently moves back to approximately its mid position, the projections 134 and 136 engage thereby forcing contacts 98 and 100 apart against the pull of the magnet 124. Separation of the contacts 98 and 100 de-energizes both the pitch decreasing winding 112 and the magnet 124. Similarly, upon movement of the piston to the right against the stop 90, the contacts 98 and 102 engage to complete a circuit to the pitch increasing winding 122 through the magnet 124 and these contacts remain engaged until they are forcibly separated by engagement of the projections 134 and 136 upon return movement of the piston 76 to its mid position. With this construction, correction or change of the pitch angle of the blades of the propeller 30 starts only after the piston 76 moves against either of the stops 88 and 90 and continues until the piston returns approximately to its mid position. As herein used, any connection between a pair of members such that one of said members must be moved a predetermined extent before said one member is effective to cause any movement of the other of said members is termed "lost-motion means." Accordingly, the means operatively connecting the speed responsive piston 76 to the pitch changing motor 114 includes or constitutes such lost-motion means.

With the shoulders 130 and 132 disposed behind the contacts 100 and 102, if the contact arm 96 is sufficiently rigid, the shoulders 130 and 132 may be relied upon to limit the movement of the piston 76 in place of the stops 88 and 90.

The position of the servo valve 54 is controlled by the turbine governor 40 as previously described. The sleeve 56, within which the valve 54 is slidable, is connected to a manual control handle 140 by means of a lever 142 and a link 144. In this way, the turbine speed, maintained by the governor 40, is set by manual adjustment of the sleeve 56 by the control handle 140. Thus, movement of the sleeve 56 to the right (Figure 1) results in fluid pressure being admitted to the right end of the cylinder 78 to move the piston 76 against the stop 88. Similarly, movement of the sleeve 56 to the left from its position in Figure 1 results in fluid pressure being admitted to the left end of the cylinder 78 to move the piston 76 against its stop 90. These piston movements are operative to vary the speed of the turbine as previously described.

A second control handle 146 is also provided for regulating the fuel flow to the turbine combustion chamber nozzles 18. To this end, a link 148 pivotally connects the handle 146 to the pivotally connected ends of toggle links 150 and 152. The other end of the toggle link 150 is provided with a fixed pivot 154 while the other end of the toggle link 152 is pivotally connected to one end of a bell crank lever 156. The other end of the bell crank lever 156 is pivotally connected to one end of a floating lever 158 by a link 160. An intermediate point on the floating lever 158 is pivotally connected to a rod 162 secured to the piston 76. The other end of the floating lever 158 is pivotally connected to one end of a second floating lever 164 by a link 166. The floating lever 164 is provided with an intermediate pivotal connection on a piston rod 168 hereinafter described. The other end of the floating lever 164 is connected to the control arm 170 of a pump 172 by a link 174. The pump 172 comprises a positive displacement pump preferably driven from the turbine by suitable means (not shown) and the control arm is movable clockwise and counterclockwise (Figure 1) to respectively increase and decrease the rate of discharge of the pump for a given turbine speed. The pump 172 supplies fuel through the conduit 176 which communicates with the turbine combustion chamber nozzles 18 by passage means (not shown).

The pump 172 may be similar to conventional multi-piston type pumps—e. g. such as disclosed in Patent No. 2,393,544 but with all the pump pistons supplying fuel to the fuel manifold 17. However, instead of controlling the discharge rate of a positive displacement pump, the pump may be provided with a by-pass passage with the arm 170 controlling a valve in the by-pass passage. This latter arrangement is illustrated in the modification of Figure 4.

In Figure 1, the control handle 146 is in its minimum power position and movement of the handle in either direction (right or left) from this position lowers the end of the toggle link 152 connected to the bell crank lever 156 to cause clockwise rotation of the bell crank lever thereby effecting clockwise rotation of the pump control arm 170 to increase the rate of fuel supplied to the turbine combustion chamber nozzles 18. Accordingly, the control handle 146 controls the torque output of the turbine and, as previously described, the control handle 140 controls the speed of the turbine.

With the control system so far described, if, for example, the turbine speed falls slightly below that for which the governor sleeve 56 is set, fluid pressure is admitted to the cylinder 78 to move the piston 76 to the left toward its stop 88. This small movement of the piston 76 causes a small clockwise adjustment of the fuel pump control arm 170 and therefore immediately results in a small increase in the rate of fuel flow to the turbine combustion chamber nozzles 18, thereby effecting a correspondingly small increase in the speed of the turbine. If the deviation of the turbine speed, from the value for which the governor is set, is quite small—e. g. less than 1.0% of the normal turbine speed—the turbine speed increase resulting from the aforementioned increase in fuel flow may be sufficient in magnitude and may occur sufficiently fast to restore the turbine speed to the value for which the governor is set before the piston 76 reaches the end of its travel against the stop 88. If so, there is no adjustment of the pitch angle of the propeller blades. Similarly, if the turbine speed is only slightly above that for which the governor is set, the piston 76 will move a little to the right toward its stop 90 to decrease the fuel flow, thereby reducing the turbine speed with little or no adjustment of the pitch of the propeller blades. Accordingly, small corrections in the speed of the turbine are effected by small oscillatory movements of the piston 76 with no adjustment of the pitch of the propeller blades.

If, for some reason, the turbine speed falls substantially below the speed for which the governor speed 56 is set, or the speed setting of the sleeve 56 is suddenly substantially increased (that is, the sleeve 56 is moved to the right in Figure 1), fluid pressure will be admitted to the cylinder 78 to move the piston 76 toward its stop 88. This piston movement effects a small increase in the rate of fuel flow to the turbine combustion chamber but the resulting increase in turbine speed now is not sufficient to bring the turbine speed to the value for which the governor is set. Accordingly, the piston 76 moves against the stop 88 whereupon the motor 114 operates to decrease the pitch angle of the propeller blades, thereby further increasing the turbine speed. This pitch adjustment and resulting turbine speed increase continues while the piston 76 engages the stop 88 and, when the turbine speed is substantially at the value for which the governor is set, the piston 76 returns to its mid position. The operation of the pitch changing motor 114 continues until the piston 76 has returned substantially to its mid position. The return movement of the piston 76 to its mid position also effects a small decrease in the rate of fuel supply to partially balance the increase in turbine speed effected by the pitch changing motor 114 during said return movement of the piston 76. The turbine speed will now be at, or substantially at (e. g., within 0.5% of the normal turbine speed) the speed for which the governor is set so that small movements of the piston 76 will maintain the turbine speed at the value for which the governor is set by correspondingly small adjustments of the fuel flow to the turbine combustion chamber. Similarly, if the turbine speed is considerably above that for which the governor is set, the major correction of the turbine speed is effected by an increase in the pitch of the propeller blades and the final small adjustment of the turbine speed is effected by small adjustments of the rate of turbine fuel flow by the piston 76. Accordingly, when the turbine speed differs from that for which the governor is set, major corrections in the speed of the turbine are effected by changes in the pitch of the propeller blades and final or small corrections of the turbine speed are effected by small changes in the rate at which fuel is supplied to the turbine combustion chamber nozzles 18.

The efficiency and power output of a gas turbine generally are a maximum when the turbine is operated at its maximum permissible temperature. Accordingly, when the power control handle 146 is set for maximum fuel flow, the turbine is operated at or near its maximum permissible temperature so that it is necessary to provide means to prevent the turbine temperature from exceeding a predetermined maximum value. To this end, means are provided to reduce the fuel flow by moving the rod 168 when the turbine temperature becomes excessive.

The rod 168 is connected to a member 180 slidable within an oil filled cylinder 182 and a restricted passage 184 establishes communication between opposite sides of the member 180. With this construction, the member 180 and cylinder 182 comprise a dash pot. The member 180 is connected to a piston 186 through a two-way resilient connection 188. A pair of springs 190 on opposite sides of the piston 186 urge the piston to a mid position within the cylinder 192 as illustrated in Figure 1. A restricted passage 194 through the piston 186 permits the springs 190 to move the piston 186 to its mid position when there is equal fluid pressure on opposite sides of this piston. Also, the ends of the cylinder 192 preferably are provided with bleed holes 196 and 198.

The position of the piston 186 is controlled by a valve 200 slidably fitted within a bore 202 and having an annular groove 204 intermediate its ends. A suitable fluid under pressure is supplied to the annular groove 204 through a conduit 206. Means are provided to move the valve 200 to the right or left (Figure 1) with increase or decrease respectively in turbine combustion chamber temperature. In view of the high temperatures at which gas turbines operate, direct temperature measurement of the turbine combustion chamber may be difficult or undesirable. Figure 1 illustrates an indirect measurement of the turbine temperature for controlling the position of the valve 200.

The operating temperature of a gas turbine increases and decreases with increase and decrease respectively of the rate of turbine fuel supply. Also, since gas turbines are supplied with more air than is necessary for combustion, an increase in the mass flow of air into the turbine reduces the turbine temperature because of the cooling produced by thhe excess air and vice versa. Accordingly, it is possible to use fuel and air flow measurements to approximately measure the turbine combustion chamber temperature. As illustrated, the rate of fuel flow to the turbine fuel manifold 17 is measured by a restriction 208 in the fuel flow path to said manifold. A flexible diaphragm 210, subjected to the pressure differential across the restriction 208 by means of passages 209 and 211, is urged to a mid position by springs 212. A rod 214, secured to the diaphragm 210, is pivotally connected to a collar 216 slidable along a floating lever 218. A second collar 220 is slidable along the other end of the lever 218 and is pivotally connected to a rod 222 secured to a second flexible diaphragm 224. The diaphragm 224 is urged to a mid position by springs 226 and is subjected to a pressure differential proportional to the air flow as measured by a venturi 228 in the air intake duct 12. The pressure differential created by the venturi 228 is transmitted to the diaphragm 224 by passages 227 and 229. An intermediate portion of the floating lever 218 is pivotally connected to a rod 230 which is connected to an arm 232 for sliding movement therealong. The arm 232 is formed rigid with a rod 234 extending from the valve 200.

With this turbine temperature measuring apparatus, an increase in fuel flow results in movement of the diaphragm 210 to the right to move the valve 200 to the right and a decrease in air flow moves the diaphragm 224 to the right to also move the valve 200 to the right and vice versa. In this way, by properly locating the pivotal connection of the rod 230 to the floating lever 218 between the collars 216 and 220, the movements of the valve 200 can be made substantially proportional to changes in the temperature of the turbine combustion chamber 16.

The pressure differential of the venturi 228 is not an accurate measure of the mass flow of air into the turbine when the density of the entering air is a variable—for example, as a result of changes in aircraft altitude. To compensate for the effect of changes in air density, a sealed bellows 236 is slidably connected to the rod 230. The bellows 236 is exposed to atmospheric pressure so that it expands or retracts respectively with decrease or increase in air density thereby raising or lowering the rod 230 and the floating lever 218. In this way, the relative effect of changes in fuel flow and air flow, as measured by the diaphragms 210 and 224, on the position of the valve 200 is controlled by the bellows 236 to compensate for changes in air density. Additional means may be provided to compensate for the effect of changes in the air speed of the aircraft and for changes in the rotative speed of the turbine on the temperature of the turbine in order to provide for an accurate measure of the turbine temperature.

When the temperature of the turbine combustion chamber 16 exceeds a maximum predetermined value, the valve 200 moves to the right to an extent sufficient to uncover a passage 238 to admit fluid pressure to the right side of the piston 186 from the annular groove 204 thereby moving the piston 186 toward the left. This movement of the piston is transmitted through the resilient connection 188, dash pot member 180 and the rod 168 to the floating lever 164 to decrease the rate of fuel supplied by the pump 172 to the turbine fuel manifold 17. As a result, the turbine temperature decreases and the valve 200 moves back to the left thereby closing the passage 238 whereupon the piston 186 is returned to its mid position by the springs 190 thereby again increasing the fuel supply. If the control handle 146 is still at its maximum position or at a position calling for a turbine fuel flow otherwise resulting in an excessive turbine temperature, the valve 200 will again move to the right to uncover the passage 238 to reduce the fuel flow. In this way, with the handle 146 set at its maximum position, the valve 200 will automatically operate to provide a fuel flow which is just sufficient to maintain a predetermined maximum turbine combustion chamber temperature.

The dash pot member 180 and resilient connection 188 preferably are interposed between the piston 186 and floating lever 164 as previously described. As a result, small fluctuations of the piston 186 are not transmitted to the floating lever 164 so that only average movements of the piston 186 are transmitted to the floating lever 164 for varying the fuel flow.

Means comprising passages 240, 242 and 244 are arranged to provide a short circuit path between opposite sides of the dash pot member 180. A valve 246 connected to the valve 200 by the rod 234 is arranged to normally close this short circuit path between the passages 240 and 242. The valve 246 is provided with an annulus 248 so that if the control lever 146 is suddenly moved to its maximum power position, the resulting large increase in fuel flow will cause the valves 200 and 246 to move sufficiently far to the right to aline the valve annulus 248 with the passage 240 and 242 thereby short circuiting the dash pot member 180. Accordingly, the resulting leftward movement of the piston 186 is quickly transmitted to the floating lever 164 to reduce the fuel flow and minimize the danger from a sudden rise in turbine temperature.

In its mid position (illustrated in Figure 1), the power control lever 146 will set the fuel flow at a minimum value. However, the minimum fuel flow necessary to keep the turbine operating will vary with such factors as aircraft air speed, air temperature, air density, etc. Therefore, it is desirable to provide means to automatically insure a fuel flow sufficient to keep the turbine operating. To this end, a valve 250 is connected to a diaphragm 252 which is subjected to a fuel pressure proportional to the torque output of the turbine. This torque responsive pressure may be obtained from any conventional torque meter—for example, such as disclosed in Patent No. 2,289,285 to R. Chilton. Such a torque meter is schematically illustrated in Figure 1 and comprises a piston 254 urged to the left with a force proportional to the torque output of the turbine. Movement of the piston 254 to the left is resisted by fluid pressure supplied by a pump 256 and the piston 254 is movable against this fluid pressure to close a fluid bleed orifice 258. In this way, the piston 254 moves to the left against the fluid pressure until the bleed orifice 258 is covered to such an extent that the fluid pressure just balances the torque responsive force acting on the piston 254. Accordingly, fluid pressure output of the pump 256 is proportional to the torque output of the turbine.

When the torque responsive fluid pressure falls below a predetermined value, a spring 260 moves the diaphragm 252 and the valve 250 to the left to uncover a passage 262. Fluid pressure is then admitted to the left side of the piston 186 from the annular groove 204 through a passage 264, annular valve space 266 and the passage 262. This fluid pressure moves the piston 186 to the right to effect an increase in the fuel flow thereby increasing the torque output of the turbine whereupon the valve 250 is moved back toward the right by the torque responsive fluid pressure. In this way, the valve 250 automatically modifies the rate at which fuel is supplied to the turbine combustion chamber to prevent the turbine torque output from falling below a predetermined minimum value.

Instead of being controlled by the torque output, the valve 250 may be controlled by other means—such as the axial thrust resulting from rotation of the propeller 30—in order to insure a minimum turbine power output.

A second by-pass or short circuit path is provided around the dash pot member 180. This path is normally closed by a valve 268 and comprises the passage 240, a passage 270 and the passage 244. The valve 268 is connected to the torque responsive valve 250 by a rod 272 and is provided with an annulus 274 adapted to complete said path when the turbine torque output becomes sufficiently low to move the valve 268 to the left to aline the annulus 274 with the passages 270 and 244. Accordingly, if the turbine torque output falls quite low, the dash pot member 180, in effect, is short circuited so that the piston 186 quickly increases the rate of fuel supplied to the turbine to keep the turbine operating.

Means are also provided to reduce the rate of turbine fuel supply if the speed of the turbine should exceed a predetermined maximum value. To this end, a governor contact 278 engages a contact 280 when the turbine speed becomes excessive. Contacts 278 and 280, when engaged, complete an electric circuit to a solenoid winding 282 to close a fuel valve 284 by moving an arm 286 connected to the fuel valve. The end of the arm 286 remote from its valve 284 is connected to a diaphragm 288 and a spring 290 acts on the diaphragm to urge the valve 284 toward its open position.

A chamber 292 on one side of the diaphragm 288 is sealed except for a check valve 294 which opens to admit air into the chamber 292 but prevents air flow out of the chamber except through a restricted passage 296. In this way, when the turbine speed decreases sufficiently to separate the contacts 278 and 280, the solenoid 282 is de-energized. Because of the restriction 296, the resulting opening movement of the valve 284 by the spring 290 only takes place slowly as air is forced out of the restriction. However, when the turbine speed becomes excessive and the solenoid 282 is energized, the fuel valve 284 quickly closes because the check valve 294 opens against a light spring 298 to quickly admit air into the chamber 292. This operation of the check valve 294 and restricted passage 296 prevents rapid oscillation of the fuel valve 284 between its open and closed positions and still permits quick closing of the fuel valve when the turbine speed becomes excessive.

During aircraft landing, it is common practice to reverse the pitch of the propeller blades to provide the aircraft with reverse thrust to brake its forward speed. To this end, the lever 146 is laterally shiftable as schematically illustrated in Figures 2 and 2A. In position A (Figure 2), the lever 146 sets the fuel rate to its minimum value and the pitch of the propeller blades is such as to provide the aircraft with normal or forward thrust. Movement of the lever 146 from position A toward position B in Figure 2 corresponds to clockwise pivotal movement of the lever 146 in Figure 1, whereupon this motion is transmitted by the toggle links 150 and 152, etc to effect clockwise rotation of the fuel pump capacity control arm 170 thereby increasing the rate of fuel supply to the turbine. Movement of the lever 146 sideways from position A to position C in Figure 2 corresponds to movement of the lever 146 along its pivot axis in Figures 1 and 2A and this movement has no effect on the rate of fuel supply but as illustrated in Figure 2A is operative to shift the propeller pitch reversing switch 109. For this purpose, the lever 146 is connected to the reversing switch 109, by a member 297 having a forked end 298 received between flanges 299 on the pivot hub of the lever 146 as seen in Figure 2A. Accordingly, movement of the lever 146 from position A to position C (that is to the left along its pivot axis as seen in Figure 2A) moves the reversing switch 109 to disengage contacts 107 and 108 and contacts 119 and 120 and to engage contacts 108 and 288 and contacts 120 and 290, thereby reversing the connections of the windings 112 and 122 of the pitch changing motor 114. Accordingly, in position C of the control lever 146, the propeller provides the aircraft with reverse thrust and the fuel supply is maintained to provide the same minimum torque output as in position A. In order to effect operation of the motor 114 to reverse the pitch of the propeller blades, it may be necessary to at least temporarily change the speed setting of the control handle 140 in order to initiate operation of the motor 114. Movement of the lever 146 to the left from position C to position D in Figure 2 corresponds to counterclockwise pivotal movement of this lever in Figure 1 whereupon this motion is transmitted by the toggle links 150 and 152, etc. to gradually increase the rate of fuel flow by rotating the pump capacity control handle 170 in a clockwise direction. Thus, movement of the control handle 146 from position A to position B and from position C to position D both operate to increase the rate of fuel supply to the turbine but with the handle 146 in the path C to D, the propeller provides the aircraft with reverse thrust. Accordingly, the operation of the power control system is the same whether the propeller provides the aircraft with forward or reverse thrust. The control handle 146 may be provided with another position E in which the handle is operative to completely shut off the fuel supply to the turbine by means not shown.

Figure 3 illustrates a modification of a portion of Figure 1 in which the valve 200 is controlled by means directly instead of indirectly responsive to the turbine temperature. Like parts of Figures 1 and 3 have been indicated by like reference numerals. In Figure 3, a suitable thermostat such as a bellows 310, containing a suitable temperature responsive liquid, is disposed so as to be responsive to changes in temperature of the turbine combustion chamber 16. The free end of the bellows 310 is connected to a contact 312 which is movable along a resistance 314 with expansion and contraction of the bellows 310. The resistance 314 forms one arm of a Wheatstone bridge circuit in which resistances 316, 318 and 320 form the other arms of the bridge.

A suitable source of electric energy 322 is connected to the bridge and a relay 324 is connected across the bridge so that when the bridge is balanced, there is no current flow through the relay. With the bridge balanced, an increase in turbine temperature expands the bellows 310 to move the contact 312 to the right along the resistance 314 thereby unbalancing the bridge whereupon the relay 324 operates to move its contact arm 326 into engagement with a contact 328. Engagement of contacts 326 and 328 completes a circuit including a source of electric energy 329 and a winding 330 of an electric motor 332 geared to a rack 334 carried by the valve rod 234. The motor 332 then operates to move the valve 200 to the right. A contact 336 is movable with the valve 200 and valve rod 234 along the resistance 316 to vary this resistance in a direction to rebalance the bridge. Similarly, a decrease in turbine temperature results in adjustment of the contact 312 to the left to unbalance the bridge in the opposite direction whereupon the relay 324 moves its contact 326 into engagement with a contact 338. A circuit is now completed to a winding 340 of the motor 332 to move the valve 200 to the left and at the same time the contact 336 is moved to the left along the resistance 316 to rebalance the bridge. The resistance 320 of the bridge may be varied as indicated whereby the turbine combustion chamber temperature for which the bridge is balanced may be varied. That is, the maximum turbine operating temperature can be varied by changing the magnitude of the resistance 320 in the bridge circuit.

With the system of Figure 1 or 3, the torque or fuel control handle 146 is movable to set the rate of fuel supply to the turbine and the turbine temperature measuring means only controls the rate of fuel flow to prevent the turbine temperature from exceeding a predetermined maximum value. As a further modification, the torque or fuel control handle, instead of directly setting the rate of fuel flow, may set a suitable temperature regulator for a desired turbine temperature whereupon the regulator operates to vary the fuel flow to maintain the temperature for which the regulator is set. This latter arrangement is illustrated in Figure 4. In addition in Figure 4 the centrifugal type governor 40 of Figure 1 has been replaced by an electric governor responsive to the frequency of the electric current of an alternating current generator driven by the gas turbine. Also, in Figure 4, the generator supplying the frequency signal for the governor also supplies all the energy for operating the control system.

In Figure 4, a gas turbine 350, similar to the gas turbine 10 of Figure 1, is drivably connected to an adjustable pitch propeller 352. In addition, the turbine is drivably connected to an alternating current generator 354 which supplies an electric current whose frequency is proportional to the speed of the turbine. The speed of the turbine is controlled by an electric governor 356 similar to that disclosed in the co-pending application Serial No. 654,118 of J. L. Bogdanoff, now Patent No. 2,544,523. In addition, the generator 354 supplies electric energy to a rectifier 355 which, in turn, supplies direct current to a pair of power leads 357 and 359. The governor 356 comprises a pair of electric circuits 358 and 360 connected in parallel to the generator 354. The circuit 358 includes an inductive winding 362 and a condenser 364, while the circuit 360 includes an inductive winding 366 and a condenser 368. The windings 362 and 366 are provided respectively with movable cores 370 and 372 of suitable magnetic material and joined together by a member 374 of suitable non-magnetic material. The cores 370 and 372 and intermediate portion 374 comprise a composite member 376.

The governor arrangement is such that each winding 362 and 366, in response to current flow therethrough, tends to pull in its core. Also, when the current flowing through the windings 362 and 366 is the same and with their cores 370 and 372 symmetrically disposed, then the pull on each core balances the pull on the other so that there is no movement of the composite member 376. The capacitive reactance of the condensers 364 and 368 and the inductive reactance of the windings 362 and 366 are so chosen that the two circuits 358 and 360 have sharp resonant peaks of slightly different frequency. Accordingly, any increase in the frequency of the current output of the generator 354 results, for example, in an increase in the magnitude of the current in circuit 360 and a decrease in the magnitude of the current in the other circuit 358 whereby the composite member 376 is pulled to the right. Similarly, a decrease in the frequency of the current output of the generator 354 results in an increase in the magnitude of the current in the circuit 358 and a decrease in the magnitude of the current in the circuit 360 whereupon the composite member 376 is pulled to the left.

As hereinafter described, the member 376 is movable to control the pitch angle of the blades of the propeller 352, thereby controlling the turbine speed. A control handle 378 is operatively connected to the condensers 364 and 368 as schematically indicated at 379 to simultaneously increase or decrease the capacitive reactance of these condensers to set the turbine speed to be maintained. This operation of the governor 356 is more fully described in the aforementioned co-pending application of J. L. Bogdanoff. Also, as disclosed in said co-pending application, the circuits 358 and 360 may be provided with re-balancing condensers controlled by movement of the composite member 376.

The composite member 376 is movable to control the pitch angle of the propeller blades in a manner similar to the piston 76 illustrated in Figure 1. Accordingly, an arm 380 is connected to the composite member 376 by a rod 382 and a contact 384 is carried by the outer end of the arm 380. The contact 384 is disposed between a pair of contacts 386 and 388 carried by flexible contact arms 390 and 392 supported by a housing 394. The housing 394 is provided with abutments 396 and 398 disposed behind the flexible arms 390 and 392 respectively and against which these arms are urged by their inherent resiliency. The abutments 396 and 398 with the contacts 386 and 388 act as stops to limit the range of movement of the composite member 376 and springs 400 and 402 may be provided to help centralize the member 376.

The contact 388 is connected to a winding 404 of a pitch changing motor 406 via a conductor 408, contacts 410 and 412 of a reversing switch 414 and a conductor 416. The other switch contact 388 is connected to a second winding 418 of the motor 406 via a conductor 420, contacts 422 and 424 of the reversing switch 414 and a conductor 426. Also, the intermediate contact 384 is connected to one side of the power lead 357 through a winding 428, a conductor 430, a switch 432 and a conductor 434. The motor 406 is connected to the other power lead 359 by a conductor 436, a switch 432 and a conductor 438, while the other side of the motor 406 is connected to its windings 404 and 418.

With this governor construction, an increase in the frequency of the current output of the generator 354 is arranged to effect movement of the composite member 376 to the right to bring contacts 384 and 388 into engagement. This engagement completes a circuit to the winding 418 of the pitch changing motor 406 whereupon the motor 406 operates to increase the pitch of the blades of the propeller 352 thereby decreasing the speed of the turbine. Similarly, a decrease in the frequency of the current output of the generator 354 is arranged to effect movement of the member 376 to the left to bring contacts 384 and 386 into engagement. This engagement completes a circuit to the other winding 404 of the pitch changing motor 406 whereupon the motor operates to decrease the pitch of the propeller blades, thereby increasing the speed of the turbine.

The winding 428 is carried by the arm 380 and is connected in series with the contact 384 whereby this winding is energized whenever the motor 406 operates. The winding 428, when energized, comprises a magnet which is arranged to attract a metallic shoe 442 on the arm 390 or a metallic shoe 444 on the arm 392, depending on whether contact 386 or contact 388 is engaged by the intermediate contact 384. The arrangement is such that, when the contacts 384 and 386 are engaged, the magnet 428 is operative to hold them in engagement until the composite member 376 returns substantially to its mid position whereupon insulated projections 446 and 448 on the flexible arms 390 and 392, respectively, engage to forcibly separate the contacts 384 and 386. Similarly, when the contacts 384 and 388 are engaged, the magnet 428 holds these contacts in engagement until the member 376 returns substantially to its mid position when the projections 446 and 448 again engage to forcibly separate these contacts.

With this construction of Figure 4, the pitch changing motor 406 does not operate until the member 376 moves to either limit of its travel. The motor 406 then starts and its operation continues until the member 376 returns substantially to its mid position. This control of the motor 406 by the member 376 is similar to the control of the pitch changing motor 114 by the piston 76 as illustrated in Figure 1. Also, as in Figure 1, movement of the member 376 is operative to vary the rate of fuel flow to the turbine. To this end, a contact arm 450 is carried by a rod 452 extending from the member 376. A contact 454 on the arm 450 is movable with the arm to adjust the magnitude of a resistance 456 forming part of an arm of a Wheatstone bridge circuit. As hereinafter described, this bridge circuit controls the rate at which fuel is supplied to the turbine and, since the member 376 only has a small range of movement, the contact 454 is movable by the member 376 to provide only small variations in the rate of fuel flow. Accordingly, the speed responsive governor 356 of Figure 4 controls the turbine speed by varying the pitch angle of the propeller blades and by varying the rate of fuel flow to the turbine in a manner similar to the control illustrated in Figure 1. That is, major corrections in turbine speed are effected by varying the pitch angle of the propeller blades and small or final corrections in the speed of the turbine are effected by small variations in the rate of fuel supply.

A resistance 458 is connected in series with a resistance 456 to complete one arm of the Wheatstone bridge circuit. Resistances 460 and 462 comprise two other arms of the bridge circuit and serially connected resistances 464 and 465 complete the final arm of the bridge circuit. A contact 466 carried by an arm 468 is movable to adjust the magnitude of the resistance 458. The arm 468 is pivotally connected to one end of a bell crank lever 470. The other end of the bell crank lever 470 is pivotally connected to one end of a toggle link 474. The other end of the toggle link 474 is pivotally connected to a second toggle link 476 having a fixed pivot at 478. A control handle 480 is pivotally connected to the junction of the toggle links 474 and 476 by a link 482. With this arrangement, clockwise or counterclockwise movement of the control handle 480 from the position illustrated in Figure 4 is operative to increase the magnitude of the resistance 458 in the bridge circuit.

A bellows 484 containing a suitable temperature responsive fluid is disposed so as to be responsive to the temperature of the turbine combustion chamber. A contact 486 connected to the free end of the bellows 484 is movable with expansion and contraction of the bellows 484 to increase or decrease the resistance 460 in the bridge circuit. The bridge is connected across the power leads 357 and 359 by conductors 488 and 490. A relay 492 is connected across the Wheatstone bridge so that when the bridge is balanced there is no current flowing through the relay. If, when the bridge is balanced, the turbine temperature increases, the bellows 484 expands to increase the resistance 460 in the bridge, thereby unbalancing the bridge. The current now flows through the relay 492 in one direction to move its contact 494 into engagement with a fixed contact 496. Engagement of the contacts 494 and 496 completes a circuit through a motor 508 and its winding 506 via conductors 498, 500, 502 and 504, said motor being operatively geared to a rack 510 formed on a bar 512. The resulting operation of the motor 508 is effective to move the bar 512 to the right, thereby moving a valve control arm 514 to effect an opening adjustment of a valve 516 controlling a by-pass passage around a positive displacement fuel pump 518. The pump 518 preferably is driven from the turbine 350 and is arranged to supply fuel to the turbine combustion chamber through a passage 519. Accordingly, this opening adjustment of the by-pass valve 516 reduces the rate at which fuel is supplied to the turbine by the pump 518 through the passage 519. Similarly, upon a decrease in turbine temperature, the bellows 484 contracts to decrease the resistance 460 in the bridge circuit whereupon the bridge is unbalanced so as to send current through the relay 492 in the reverse direction. The relay now moves its contact 494 into engagement with a second fixed contact 520 thereby completing a circuit to a second winding 522 of the motor 508 via the conductor 498, a conductor 524 and the conductors 502 and 504. The motor 508 now operates to move the bar 512 to the left to effect a closing adjustment of the by-pass valve 516, thereby increasing the rate of fuel supplied to the turbine.

Preferably, a contact 526 is carried by an arm 528 extending from the bar 512 to adjust the magnitude of the resistance 462 in the bridge circuit to help re-balance the bridge. For example, when the turbine temperature increases to increase the resistance 460 in the bridge circuit, the bar 512 is moved to the right, as previously described, to reduce the rate of fuel supplied to the turbine and, at the same time, the contact 526 is moved to the right to increase the resistance 462 in the bridge circuit to help re-balance the bridge.

Movement of the control handle 480 to the right from the position illustrated in Figure 4 increases the resistance 458 in the bridge circuit to unbalance the bridge in the direction so that the relay 492 operates to engage contacts 494 and 520. Engagement of contacts 494 and 520 results in energization of the motor winding 522 whereupon the motor 508 moves the bar 512 to the left to effect a closing adjustment of by-pass valve 516 to increase the rate of fuel supply to the turbine. At the same time, the contact 526 is moved to the left by the bar 512 to decrease the resistance 462 in the bridge to rebalance the bridge. Similarly, return movement of the handle 480 unbalances the bridge to reduce the fuel flow. In this way, the handle 480 is movable to set the bridge circuit for the desired turbine operating temperature and the bridge circuit and apparatus controlled thereby automatically operates to maintain this temperature.

The control handle 480 preferably has a path of movement similar to the control handle 146 as illustrated in Figure 2. Accordingly, the handle 480 is connected to the reversing switch 414 so that sideways movement of the handle 480 operates to move the reversing switch from its normal position illustrated in Figure 4 to bring its contacts 412 and 424 into engagement with contacts 530 and 532 respectively. This movement of the reversing switch 414 reverses the connections of the pitch changing windings 404 and 418 to the control contacts 384 and 386. Accordingly, when the handle 480 is moved sideways to move the reversing switch from the position illustrated to engage contacts 530 and 532, the pitch of the propeller blades is reversed so that the propeller provides the aircraft with reverse thrust.

In Figure 1, means are provided to insure a sufficient rate of fuel supply to the turbine to maintain the turbine torque output above a predetermined minimum value. In Figure 4, when the control handle 480 is in its mid position, as illustrated, the turbine temperature is set for a predetermined minimum value and the temperature regulator automatically controls the rate of fuel flow to maintain this temperature. Since the torque output of the turbine is a function of the turbine temperature, it is not as necessary in Figure 4 to provide additional means, as in Figure 1, to modify the fuel flow to insure a predetermined minimum turbine torque output. However, the turbine torque output depends not only on turbine temperature but also on such factors as atmospheric temperature and pressure and aircraft speed. Accordingly, as a further precaution against the turbine stopping when the control handle 480 is in its minimum position (as illustrated), means are provided to decrease the magnitude of the resistance 464 in the bridge circuit when the turbine torque output falls below a predetermined value thereby unbalancing the bridge circuit to effect an increase in the rate of fuel flow. To this end, a contact 534 carried by a plunger 535 is movable to adjust the magnitude of the resistance 464 in the bridge circuit. A light spring 536 urges the arm 535 to its normal position against a suitable stop. A diaphragm 537 is subjected on one side to a fluid pressure proportional to the torque output of the turbine and a spring 538 urges the diaphragm 537 in the opposite direction. This torque responsive fluid pressure may be obtained from any suitable torque meter—e. g. as described in connection with Figure 1. The arrangement is such that, when the turbine torque falls below a predetermined value, the spring 538 moves the diaphragm 537 into engagement with the plunger 535 to move the contact 534 to the right thereby decreasing the resistance 464 in the bridge circuit. This decrease in the resistance 464 unbalances the bridge to increase the rate of fuel supply to the turbine—that is, decreasing the resistance 464 in effect sets the bridge for a higher temperature. In this way, a minimum torque output is automatically assured when the turbine is operating.

As mentioned, at a particular turbine temperature, the turbine torque output varies with such factors as atmospheric conditions and aircraft speed. For example, at a particular turbine temperature, the turbine torque output will increase with decrease of temperature and/or increase of pressure of the surrounding air and with increase in aircraft speed. Therefore, at a high temperature setting of the control handle 480, there may be danger of the turbine torque output exceeding the maximum allowable for which the turbine propeller transmission has been designed. To prevent this possibility, means may be provided to reduce the rate of fuel supply to the turbine when the turbine torque output becomes excessive. To this end, the bridge resistance 465 is adjustable by a contact 539 carried by a plunger 540. A light spring 541 urges the plunger 540 and contact 539 to their normal position against a suitable stop. When the turbine torque output exceeds a predetermined value, the diaphragm 537 moves sufficiently far to the left against the spring 538 to move the plunger 540 and its contact 539 to the left for increasing the resistance 465. This increase of the resistance 465 unbalances the bridge circuit to effect a decrease in the rate of fuel flow to the turbine. That is, an increase in the resistance 465 sets the bridge circuit for a temperature lower than that otherwise called for by the control arm 480 in order to prevent excessive turbine torque output.

In the control system of Figure 4, the alternating current generator 354 not only provides the signal measuring the speed of the turbine but also provides the electric power for regulating the rate of fuel supply. That is, the output of the alternating current generator 354 not only senses changes in the speed of the turbine but also provides all the power for controlling the turbine power output. As a safety feature, it is desirable to provide for a control of the turbine power independent of the alternating current generator 354 or any of the electric circuits connected to it. For this purpose, the rod 452, connected to the composite member 376, is provided with a plurality of spaced notches 544 and a plunger 546 is urged toward engagement with the notches 544 by a spring 548. A solenoid winding 550 is connected by wires 549 to the output of the generator 354 for the governor 356. The winding 550, when energized, holds the plunger 546 against the spring 548 out from engagement with the notches 544. The plunger 546 and winding 550 comprise a unit structure operatively connected to the control handle 378 by means schematically indicated at 547 for movement along a surface 551. Should there be a failure of the current supply to the governor 356, the spring 548 will urge the plunger 546 into engagement with the notches 544 thereby mechanically connecting the control handle 378 to the composite member 376. The member 376 may now be moved mechanically from the control handle 378 to vary the pitch angle of the propeller blades.

During turbine operation, the switch 432 normally occupies the position illustrated in Figure 4 and is held in this position by a solenoid winding 552 against a spring 553. The solenoid 552 is connected across the power leads 357 and 359 by conductors 554 and 556. If there should be a failure of the electric power to the leads 357 and 359, the winding 552 is de-energized and the spring 553 moves the switch 432 downwardly into engagement with auxiliary power leads 558 and 560. The leads 558 and 560 are connected to a suitable auxiliary source of power—as, for example, a battery—for supplying the electric power to operate the pitch changing motor 406.

A second solenoid winding 562 is connected by wires 563 across the power leads 357 and 359. This winding, when energized, holds a plunger 564 against a spring 566 and out from engagement with notches 568 formed in the bar 512. The solenoid 562 and plunger 564 form a unit structure operatively connected to the handle 480 by means schematically indicated at 570 for movement along a surface 572. When there is a failure of the power in the leads 357 and 359, the spring 566 urges the plunger 564 toward engagement with the notches 568. Thereupon, the handle 480 is mechanically connected to the bar 512 and is movable to mechanically vary the rate of fuel supply to the turbine independently of any automatic temperature control.

The solenoid windings 550, 552 and 562 thereby enable the operator to manually control the turbine speed and rate of fuel supply thereto when there is a failure of the electric power supplied to the governor 356, to the automatic temperature control circuits or to the pitch changing motor 406. If desired, suitable indicating means—as, an electric lamp or lamps—may be provided to indicate failure of any portion of the electric power supply. For example, each solenoid 550, 552 and 562, when energized, may effect engagement of a switch to control the circuit of an electric indicating lamp.

As a further safety feature, it is desirable to automatically reduce or shut off the turbine fuel supply if either the turbine speed or the turbine temperature becomes excessive. For this purpose, a pair of tongs 574 are movable about their pivotal connection 576 to grip the bar 512. The pivotal connection 576 is supported for slightly restrained movement along a path substantially parallel to the bar 512 by means not shown. A lever 578, having a forked end 580, straddles the tongs 574 and is pivotally connected to a second lever 582. A spring 584 urges the levers 578 and 582 into their positions illustrated in Figure 4, in which the tongs 574 do not restrain movement of the bar 512. However, movement of the levers 578 and 582 to the right against the spring 584 causes the tongs 574 to engage the bar 512 and pull the bar to the right to reduce the rate of fuel flow to the turbine through the passage 519. If desired, a light spring may be provided to urge the tongs 574 about their pivot 576 to the position illustrated.

A temperature responsive bellows 586 is disposed so as to be responsive to the temperature of the turbine combustion chamber. If the turbine temperature should become excessive, the bellows end 588 engages the lever 582 to move the lever against the spring 584 to reduce the fuel flow as described. In addition, a conventional centrifugal governor 590 has a pair of flyweights 592 which are arranged to move a rod 594 to the right with increase in turbine speed. If the turbine speed becomes excessive, the rod 594 moves the lever 582 to the right to reduce the rate of fuel supply to the turbine. In this way, excessive turbine temperature or speed automatically results in a reduction in the rate of fuel supply to the turbine.

In all the modifications described, the fuel pump preferably comprises a positive displacement pump driven from the turbine. This arrangement is preferred since it has the advantage that there then is an automatic increase or decrease in the rate of fuel supply to the turbine respectively with increase or decrease in the turbine speed. Accordingly, in the absence of any control of the rate of supply of fuel to the turbine other than by the speed of the pump itself, the pump inherently supplies the turbine with a substantially uniform quantity of fuel per turbine revolution regardless of variations in turbine speed.

As disclosed in connection with Figure 1, the power control system of the turbine modifies the rate at which fuel is supplied to the turbine by varying the capacity of a positive displacement fuel pump while in Figure 2, the control system controls a by-pass passage around a positive displacement fuel pump. These are equivalent arrangements for controlling the rate of fuel supply to the turbine and obviously may be used interchangeably.

Figure 1 discloses indirect means for measuring the temperature of the turbine combustion chamber while Figures 3 and 4 disclose means for directly measuring the turbine combustion chamber temperature. However, since the invention is not limited to any particular means for measuring the turbine temperature, the expression "means responsive to turbine temperature" or equivalent expressions as used in the appendant claims are intended to include indirect as well as direct temperature measuring means. In Figures 3 and 4, the temperature of the turbine combustion chamber is measured by a bellows which expands and contracts to vary a resistance in an electric bridge circuit. Obviously, this resistance could be directly exposed to the temperature of said chamber, whereby its magnitude would vary with the temperature of said chamber. In fact, other conventional forms of temperature measuring means—such as a thermocouple—could be used for regulating the rate of fuel supply to the turbine.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A speed control system for an engine, said system comprising a motor operable to regulate engine speed, an electric generator arranged to be driven by said engine for supplying the electric energy for operating said motor, a first member movable to control the operation of said motor, electric means responsive to changes in the frequency of the output current of said generator for controlling said member to maintain a predetermined engine speed, a second member movable to adjust said electric means to determine the speed to be maintained, means operable to mechanically connect said first and second members upon failure of the output current of said generator to which said electric means is responsive, an auxiliary source of electric power, and means responsive to failure of the power supplied to said motor from said generator for connecting said motor to said auxiliary source of power under the control of said mechanically connected members.

2. A control system for a gas turbine drivably connected to an adjustable pitch propeller and having means for supplying fuel to said turbine, said system comprising a propeller pitch angle regulating first electric motor, a fuel regulating second electric motor, an electric generator to be driven by said turbine and adapted to supply the electric energy for operating both said electric motors, a first member movable to control operation of both said electric motors, electric means responsive to the changes in the frequency of the output current of said generator for controlling said member to maintain a predetermined turbine speed, a second member movable to adjust said electric means to determine the turbine speed to be maintained, an auxiliary source of electric power, and means responsive to failure of the power output of said generator for mechanically connecting said first and second members and for electrically connecting said first and second motors to said auxiliary source of electric power under the control of said mechanically connected members.

3. A control system for a gas turbine drivably connected to an adjustable pitch propeller and having means for supplying fuel to said turbine; said system comprising propeller pitch angle regulating means, fuel flow regulating means, means responsive to changes in the speed of the turbine for controlling both said regulating means, means responsive to changes in turbine temperature for controlling said fuel flow regulating means, means responsive to the torque output of said turbine, and means controlled by said torque responsive means for reducing the rate of fuel supply to said turbine when said torque output exceeds a predetermined value.

4. The method of controlling the speed of a gas turbine drivably connected to an adjustable pitch propeller; said method comprising the steps of regulating only the rate of fuel supply to the turbine combustion chamber in response to relatively small deviations in the speed of said turbine from a predetermined value by increasing or decreasing said fuel supply rate respectively with decrease or increase in said speed from said predetermined value; regulating the pitch angle of the propeller blades in response only to relatively large deviations in the speed of said turbine from said predetermined value for increasing or decreasing said pitch angle respectively with increase or decrease in said speed from said predetermined value; and, once said pitch angle regulation has been initiated, continuing said regulation until said turbine speed returns substantially to said predetermined value.

5. A control system for a vehicle gas turbine having adjustable means for varying its thrust output and having means for supplying fuel thereto; motor means for operating said adjustable thrust varying means; means for regulating the rate at which fuel is supplied to said turbine; turbine speed control mechanism including a member responsive to the speed of the turbine and including adjustable means for setting the turbine speed to be maintained, said member being movable from an intermediate position in response to changes in turbine speed from said set value with the magnitude and direction of said movement depending on the magnitude and direction of said speed change; motion limiting means providing first and second limits to motion of said member from said intermediate position such that when said turbine speed deviates from said set value by more than a predetermined amount said member is at one or the other of the limits of its movement depending on the direction of said speed deviation from said set value; means operatively connecting said speed responsive member to said fuel regulating means to vary the rate of fuel flow to the turbine to an extent dependent on the magnitude of the movement of said member and in a direction tending to return the turbine speed to said set value; and lost motion means operatively connecting said speed responsive member to said thrust varying motor means such that a change in turbine speed from said set value is effective to initiate operation of said thrust varying means only upon a speed change from said set value sufficient to move said member to one of its limiting positions.

6. A control system for a gas turbine having adjustable means for varying its thrust output and having means for supplying fuel thereto; said system comprising means for regulating said adjustable thrust varying means; means for regulating the rate at which fuel is supplied to said turbine; turbine speed control mechanism including means responsive to the speed of said turbine and including adjustable means for setting the turbine speed to be maintained; means operatively connecting said speed responsive means to said fuel regulating means such that a change in turbine speed from said set value is effective to cause operation of said fuel regulating means in a manner tending to return said turbine speed toward said set value; and means including lost-motion means operatively connecting said speed responsive means to said thrust varying regulating means such that a change in turbine speed from said set value is effective to cause operation of said thrust varying regulating means only upon a speed change from said set value in excess of a predetermined amount, the operation of said thrust varying regulating means being in a manner tending to return said turbine speed toward said set value.

7. A control system for a gas turbine drivably connected to an adjustable pitch propeller and having means for supplying fuel to said turbine; said system comprising propeller blade pitch angle regulating means; fuel flow regulating means; turbine speed control mechanism including means responsive to the speed of said turbine and including adjustable means for setting the turbine speed to be maintained; means operatively connecting said speed responsive means to said fuel regulating means such that a change in turbine speed from said set value is effective to cause operation of said fuel regulating means in a manner tending to return said turbine speed toward said set value; and means including lost-motion means operatively connecting said speed responsive means to said pitch angle regulating means such that a change in turbine speed from said set value is effective to cause operation of said pitch angle regulating means only upon a speed change from said set value in excess of a predetermined amount, the operation of said pitch angle regulating means being in a manner tending to return said turbine speed toward said set value.

8. A control system as recited in claim 7 in which the means operatively connecting the said speed responsive means to said pitch angle regulating means also includes means for continuing operation of said pitch angle regulating means, once said operation is initiated, until the turbine speed deviation from said set value is less than said predetermined amount.

9. A control system as recited in claim 7 in which the means operatively connecting the said speed responsive means to said pitch angle regulating means also includes means for continuing operation of said pitch angle regulating means, once said operation is initiated, until said turbine speed returns substantially to said set value.

10. A control system as recited in claim 7 and including means for limiting the magnitude of operation of said fuel regulating means by said speed responsive means such that said speed responsive means is only capable of effecting small corrections of turbine speed from said set value by operation of said fuel regulating means.

11. A control system as recited in claim 7 and including manually operable means for varying the rate at which fuel is supplied to said turbine.

12. A control system as recited in claim 7 and including temperature control mechanism having adjustable means for setting the turbine temperature to be maintained and having means responsive to changes in turbine temperature for varying the rate at which fuel is supplied to said turbine so as to maintain the turbine temperature at said set value.

13. A control system for a gas turbine drivably connected to an adjustable pitch propeller; said system comprising propeller pitch angle regulating means; a positive displacement fuel pump adapted to be driven from said turbine for supplying fuel thereto; means for regulating the quantity of fuel supplied to the turbine, per turbine revolution, by said pump; turbine speed control mechanism including means responsive to the speed of said turbine and including adjustable means for setting the turbine speed to be maintained; means operatively connecting said speed responsive means to said fuel regulating means such that a change in turbine speed from said set value is effective to cause operation of said fuel regulating means in a manner tending to return the turbine speed toward said set value; means including lost-motion means operatively connecting said speed responsive means to said pitch angle regulating means such that a change in turbine speed from said set value is effective to cause operation of said pitch angle regulating means only upon a speed change from said set value in excess of a predetermined amount, said operation of said pitch angle regulating means being in a manner tending to return said turbine speed toward said set value.

14. A control system for a gas turbine drivably connected to an adjustable pitch propeller and having means for supplying fuel to said turbine; said system comprising propeller blade pitch angle regulating means; fuel flow regulating means; turbine speed control mechanism including a member responsive to the speed of said turbine and including adjustable means for setting the turbine speed to be maintained, said member being movable from an intermediate position in response to changes in turbine speed from said set value with the magnitude and direction of said movement depending on the magnitude and direction of said speed change; means operatively connecting said speed responsive member to said fuel regulating means to vary the rate of fuel flow to the turbine to an extent dependent on the magnitude of the movement of said member and in a direction tending to return the turbine speed to said set value; means operatively connecting said speed responsive member to said fuel regulating means to vary the rate of fuel flow to the turbine to an extent dependent on the magnitude of the movement of said member and in a direction tending to return the turbine speed to said set value; means providing limits to the motion of said speed responsive member and providing a lost-motion connection between said speed responsive member and said pitch angle regulating means such that a change in turbine speed from said set value is effective to cause operation of said pitch angle regulating means only upon a speed change from said set value in excess of a predetermined amount, the operation of said pitch angle regulating means being in a manner tending to return said turbine speed toward said set value.

15. A control system as recited in claim 14 in which the means operatively connecting said pitch angle regulating means to said speed responsive member also includes means for continuing operation of said pitch angle regulating means once said operation is initiated, until the turbine speed returns substantially to said set value.

16. A control system for a gas turbine drivably connected to an adjustable pitch propeller and having means for supplying fuel to said turbine; said system comprising propeller blade pitch angle regulating means; fuel flow regulating means; turbine speed control mechanism including a member responsive to the speed of the turbine and including adjustable means for setting the turbine speed to be maintained, said member being movable from an intermediate position in response to changes in turbine speed from said set value with the magnitude and direction of said movement depending on the magnitude and direction of said speed change; motion limiting means providing first and second limits to motion of said member from said intermediate position such that when said turbine speed deviates from said set value by more than a predetermined amount said member is at one or the other of the limits of its movement depending on the direction of said speed deviation from said set value; means operatively connecting said speed responsive member to said fuel regulating means to vary the rate of fuel flow to the turbine to an extent dependent on the magnitude of the movement of said member and in a direction tending to return the turbine speed to said set value; and means including lost-motion means operatively connecting said speed responsive member to said pitch angle regulating means such that a change in turbine speed from said set value is effective to initiate operation of said pitch angle regulating means only upon a speed change from said set value sufficient to move said member to one of its said limiting positions, the operation of said pitch angle regulating means being in a manner to return the turbine speed toward said set value.

17. A control system as recited in claim 16 and including temperature control mechanism having adjustable means for setting the turbine temperature to be maintained and having means responsive to changes in turbine temperature for varying the rate at which fuel is supplied to said turbine so as to maintain the turbine temperature at said set value.

18. A control system as recited in claim 16 in which the means operatively connecting said speed responsive member to said pitch angle regulating means also includes means for continuing operation of said pitch angle regulating means, once said operation has been initiated, until the turbine speed deviation from said set value is less than a predetermined amount.

19. The method of controlling the speed of a gas turbine drivably connected to an adjustable pitch propeller; said method comprising the steps of varying only the rate of fuel supply to the turbine combustion chamber in response to relatively small deviations in the speed of said turbine from a predetermined value by increasing or decreasing said fuel supply rate with decrease or increase, respectively, in said speed from said predetermined value; and varying the pitch angle of the propeller blades in response only to relatively large deviations in the speed of said turbine from said predetermined value of increasing or decreasing said pitch angle with increase or decrease, respectively, in said speed from said predetermined value.

20. The method of controlling the speed of a gas turbine drivably connected to an adjustable pitch propeller; said method comprising the steps of regulating the rate of fuel supply to the turbine combustion chamber for increasing or decreasing said fuel supply rate with decrease or increase respectively in turbine temperature from a predetermined value; varying only the rate of fuel supply to the turbine combustion chamber in response to relatively small deviations in the speed of said turbine from said predetermined value by increasing or decreasing said fuel supply rate with decrease or increase, respectively, in said speed from said predetermined value; and varying the pitch angle of the propeller blades in response only to relatively large deviations in the speed of said turbine from said predetermined value by increasing or decreasing said pitch angle with increase or decrease, respectively, in said speed from said predetermined value.

21. A speed control system for an engine having a device operable to vary engine speed; said system comprising an alternating current generator to be driven by said engine; an electric motor for operating said engine speed varying device; means responsive to changes in the frequency of the electric output of said generator; and switch means controlled by said responsive means for electrically connecting said motor to said generator for supplying electric energy from said generator to said motor for operating said motor to control engine speed.

22. A speed control system for an engine having a variable pitch propeller drivably connected thereto; said system comprising an alternating current generator to be driven by said engine; propeller pitch angle regulating electric motor means; means electrically coupled to said generator and responsive to changes in the frequency of the electric output of said generator electric output; and switch means controlled by said responsive means for electrically connecting said motor means to said generator for supplying electric energy from said generator to said motor means so as to vary the pitch of said propeller to control engine speed.

23. A control system for a gas turbine drivably connected to an adjustable pitch propeller and having means for supplying fuel to said turbine; said system comprising propeller pitch angle regulating electric motor means; fuel regulating electric motor means; an alternating current electric generator to be driven by said engine for supplying the electric energy for operating both of said electric motor means; and means, electrically coupled to said generator, responsive to changes in the frequency of the electric output of said generator electric output for controlling the operation of both of said electric motor means.

24. A control system as recited in claim 23 and including means responsive to failure of the electric energy delivered by said generator for rendering the system operable independently thereof.

25. A control system as recited in claim 23 and including means responsive to changes in the temperature of said combustion chamber for controlling the operation of said fuel regulating electric motor means to maintain a predetermined turbine temperature.

26. A control system for an engine; said system comprising an electric motor operable to regulate an engine condition; an electric generator to be driven by said engine for supplying the electric energy for operating said motor; electric means responsive to changes in the frequency of the electric output of said generator; a first movable member controlled by said responsive means for electrically connecting said generator to said motor for operation of said motor to maintain a predetermined magnitude of said condition; a second member movable to adjust said electric means to determine the magnitude of said condition to be maintained; an auxiliary source of electric power; and means responsive to failure of the power output of said generator for operatively connecting said first member to said second member for operation thereby and for electrically connecting said motor to said auxiliary source of power under the control of said operatively connected first and second members.

WILTON G. LUNDQUIST.
WILLIAM T. STARK.
WILLIAM C. SCHAFFER.

References Cited in the file of this patent

UNITED STATES PATENTS

| Number | Name | Date |
|---|---|---|
| Re. 22,661 | Gosslau et al. | Aug. 7, 1945 |
| 1,616,230 | Richmond | Feb. 1, 1927 |
| 1,958,644 | Smith | May 15, 1934 |
| 2,155,586 | Ebert | Apr. 25, 1939 |
| 2,280,835 | Lysholm | Apr. 28, 1942 |
| 2,292,288 | Pateras Pescara | Aug. 4, 1942 |
| 2,302,042 | Martin | Nov. 17, 1942 |
| 2,303,998 | Holley | Dec. 1, 1942 |
| 2,306,953 | Jung | Dec. 29, 1942 |
| 2,336,052 | Anderson et al. | Dec. 7, 1943 |
| 2,336,232 | Doran | Dec. 7, 1943 |
| 2,382,847 | Bauman | Aug. 14, 1945 |
| 2,428,606 | Baak | Oct. 7, 1947 |
| 2,432,177 | Sedille | Dec. 9, 1947 |
| 2,492,472 | Fortescue | Dec. 27, 1949 |
| 2,521,244 | Moore | Sept. 5, 1950 |
| 2,525,460 | Roesch | Oct. 10, 1950 |